United States Patent
Koutaka

(10) Patent No.: US 6,520,698 B2
(45) Date of Patent: Feb. 18, 2003

(54) KEYBOARD INPUT UNIT HAVING FOLDABLE COVER

(75) Inventor: Yoshirou Koutaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/862,892

(22) Filed: May 22, 2001

(65) Prior Publication Data
US 2001/0048836 A1 Dec. 6, 2001

(30) Foreign Application Priority Data
May 31, 2000 (JP) .................................. 2000-163051

(51) Int. Cl.⁷ .................................................. B41J 5/08
(52) U.S. Cl. .......................................... 400/472; 16/342
(58) Field of Search .............................. 400/472, 490; 341/22, 21, 163, 168; 345/168, 169, 170, 171, 172; 235/145 R, 145 A, 146

(56) References Cited

U.S. PATENT DOCUMENTS

| | | | |
|---|---|---|---|
| 4,571,456 A | * 2/1986 | Paulsen et al. ............... | 179/2 |
| 4,635,521 A | * 1/1987 | Bellini ......................... | 84/177 |
| 4,656,913 A | * 4/1987 | Yoshikawa ................... | 84/177 |
| 5,346,164 A | 9/1994 | Allen | |
| 5,635,928 A | * 6/1997 | Takagi et al. ................ | 341/22 |
| 6,006,243 A | * 12/1999 | Karidis ........................ | 361/680 |
| 6,046,730 A | * 4/2000 | Bowen et al. ............... | 345/168 |
| 6,119,019 A | * 9/2000 | Phelps ......................... | 455/500 |
| 6,185,096 B1 | * 2/2001 | Helot et al. .................. | 16/342 |
| 6,222,724 B1 | * 4/2001 | Howell et al. ............... | 361/681 |
| 6,256,193 B1 | * 7/2001 | Janik et al. .................. | 361/683 |
| 6,292,563 B1 | * 9/2001 | Clark et al. .................. | 379/433 |

FOREIGN PATENT DOCUMENTS

JP  11-024817  * 1/1999 ............. G06F/3/02

* cited by examiner

Primary Examiner—Andrew H. Hirshfeld
Assistant Examiner—Darius N. Cone
(74) Attorney, Agent, or Firm—Brinks Hofer Gilson & Lione

(57) ABSTRACT

In a keyboard input unit whose cover member covering the top of a keyboard body is divided into at least a first segment and a second segment, the segments are foldably connected by a connecting section. The connecting section has: a first cylindrical part with a through hole provided on the first segment; a second cylindrical part provided on the second segment and having at one end a pin stopping section, the second cylindrical part being arranged on substantially the same axial line as the first cylindrical part; a connecting pin inserted from the first cylindrical part through the second cylindrical part; and an elastic stopper formed integrally with the first segment or the second segment in a position on the first cylindrical part contrary to the second cylindrical part.

12 Claims, 5 Drawing Sheets

KEYBOARD INPUT UNIT HAVING FOLDABLE COVER

BACKGROUND OF THE INVENTION

1. Field of the Invention

The present invention relates to a keyboard input unit for use with, for instance, a personal computer for family use, and more particularly to a keyboard input unit whose cover member covering the top of the keyboard is hinged onto the keyboard body and is divided into a plurality of segments to be foldable.

2. Description of the Related Art

In recent years, there has been a keyboard input unit whose cover member 100, covering the top of the keyboard body as illustrated in FIG. 9, is divided into, for instance, a first segment 101 and a second segment 102, and in which the two segments are foldably connected to each other by a connecting section 103 and the cover member 100 is hinged onto the keyboard body (not shown).

FIG. 10 shows an enlarged section of the connecting section 103. As illustrated therein, a first cylindrical part 104 formed integrally with the first segment 101 and a second cylindrical part 105 formed integrally with the second segment 102 are arranged coaxially in the vicinities of the junction between the first segment 101 and the second segment 102.

A connecting pin 106 is inserted from the first cylindrical part 104 through the second cylindrical part 105, and a thinner part 107 is provided in the space between the first cylindrical part 104 and the second cylindrical part 105, the space corresponding to the middle part of the connecting pin 106. The thinner part 107 is fitted with a stopper E ring 108 for the connecting pin 106. Therefore, as indicated by an arrow in FIG. 9, the second segment 102, pivoting on the connecting section 103 (the connecting pin 106), can be folded over the first segment 101.

The conventional keyboard input unit, since it uses the connecting pin 106 having the thinner part 107 in its middle part as illustrated in FIG. 10, is handicapped by the mechanical strength of the connecting section 103, especially vulnerable to shocks. Moreover, fitting of the E ring 108 is a troublesome, inefficient procedure, and the use of the connecting pin 106 having the thinner part 107 and of the E ring 108 involves the disadvantage of extra costs.

SUMMARY OF THE INVENTION

An object of the present invention is to obviate these problems of the prior art, and to provide a keyboard input unit which has a sufficient mechanical strength in the connecting section of the cover member, can be easily assembled and moreover is inexpensive.

In order to achieve the aforementioned object, according to the invention, there is provided a keyboard input unit whose cover member covering the top of the keyboard body is divided into at least a first segment and a second segment, the segments being foldably connected by a connecting section.

The connecting section has: a first cylindrical part with a through hole provided on the first segment; a second cylindrical part provided on the second segment, having at one end a pin stopping section, such as a bottom, and arranged on substantially the same axial line as the first cylindrical part; a connecting pin inserted from the first cylindrical part through the second cylindrical part; and an elastic stopper formed integrally with the first segment or the second segment in a position on the first cylindrical part contrary to the second cylindrical part, wherein:

the connecting pin is inserted from the first cylindrical part through the second cylindrical part while subjecting the stopper to elastic deformation; the stopper is returned to its original position by righting moment upon completion of the insertion; and the connecting pin is arranged between the pin stopping section of the second cylindrical part and the stopper.

DETAILED DESCRIPTION OF THE PREFERRED EMBODIMENTS

By using such a configuration, the invention dispenses with the connecting pin having a thinner part needed according to the prior art, resulting in an increased mechanical strength in the connecting section of the cover member. Moreover, the connecting pin is automatically prevented from coming off by only inserting it, resulting in simplified assembly, which can be automated. Furthermore, the connecting pin may be a straight rod, instead of an E ring needed according to the prior art, and this feature contributes to cost reduction and makes it possible to supply an inexpensive keyboard input unit.

Preferred embodiments of the invention will be described below with reference to drawings. FIGS. 1 through 4 illustrate a first embodiment of the invention.

Figure 1:
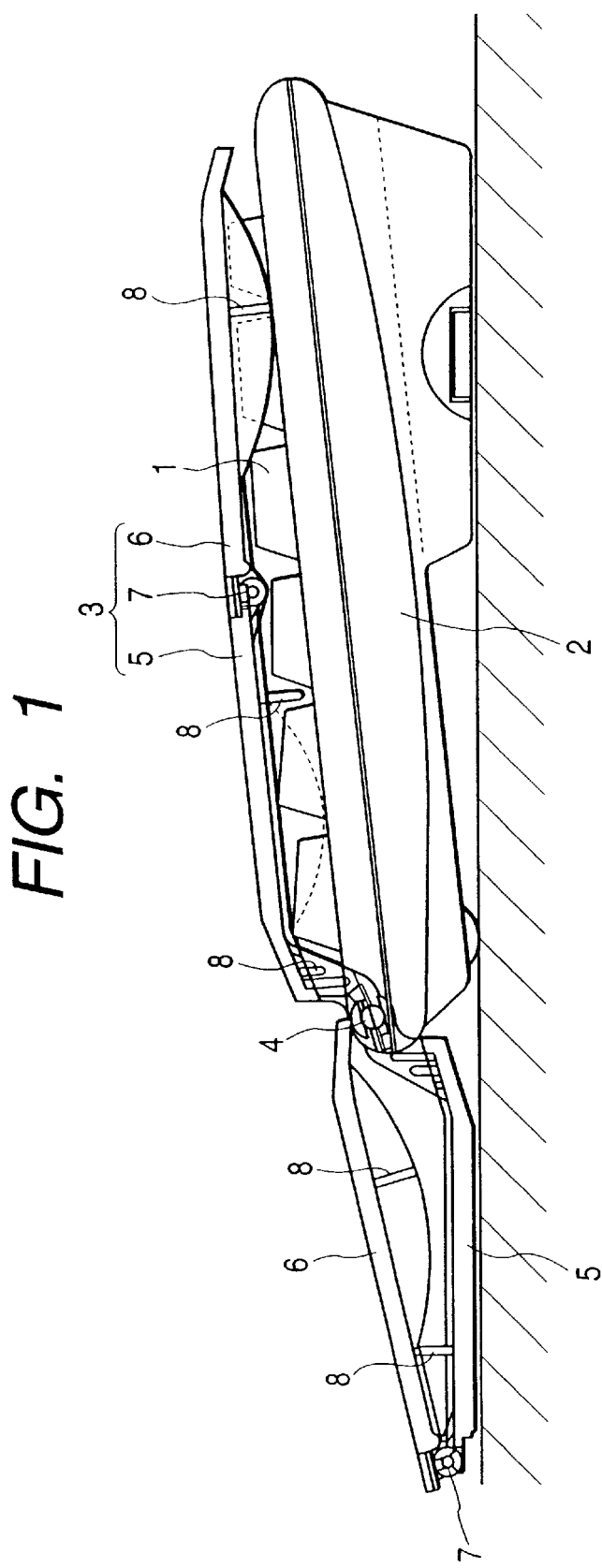
FIG. 1 is a profile of a keyboard input unit, which is the first preferred embodiment of the present invention.

As shown in FIG. 1, the keyboard input unit is provided with a keyboard body 2 having many input keys 1 and a cover member 3 covering the top of the keyboard body 2, and the base end of the cover member 3 is hinged by pins 4 onto the keyboard body 2.

Figure 9:
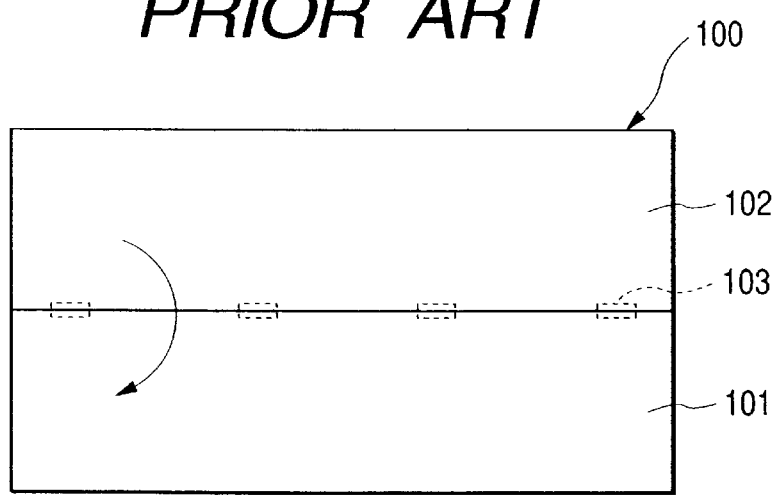
FIG. 9 is a schematic member of a cover member covering the top of a keyboard body, according to the prior art.
Figure 10:
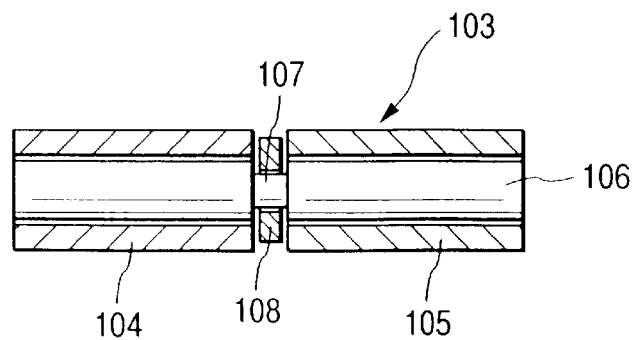
FIG. 10 shows an enlarged section of a junction between a first segment and a second segment of a cover member according to the prior art.

The cover member 3 is molded of synthetic resin, and its planar shape is rectangular like its counterpart in FIG. 9. The cover member 3 is divided about in the middle in its lengthwise direction into a first segment 5 and a second segment 6, which are foldably connected by a connecting section 7.

As illustrated in FIG. 1, covering the top of the keyboard body 2 by extending the first segment 5 and the second segment 6 enables the cover member 3 to fulfill its essential function. Further, as also shown in the diagram, the first segment 5 and the second segment 6 are enabled to serve as a wrist rest for the operator when the cover member 3 is taken off the top of the keyboard body 2, turned round the pins 4 toward the operator and folding the second segment 6 over the first segment 5 connected to the pins 4.

Figure 2:
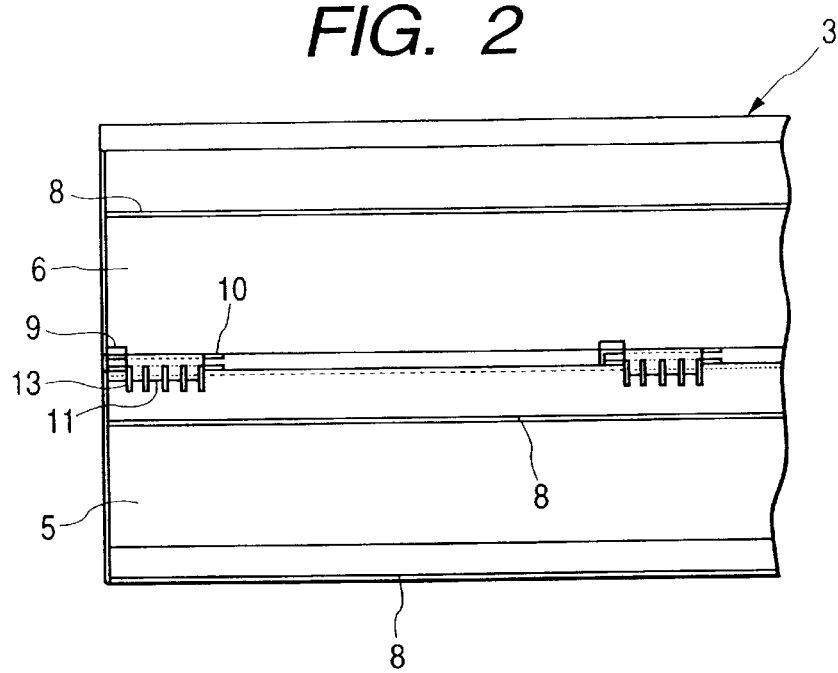
FIG. 2 illustrates part of the bottom of a cover member for use on the keyboard input unit.

As shown in FIGS. 1 and 2, underneath the first segment 5 and the second segment 6, there are provided a required number of reinforcing ribs 8 in their lengthwise direction. These reinforcing ribs 8 mainly serve to prevent the segments from warping.

Figure 3:
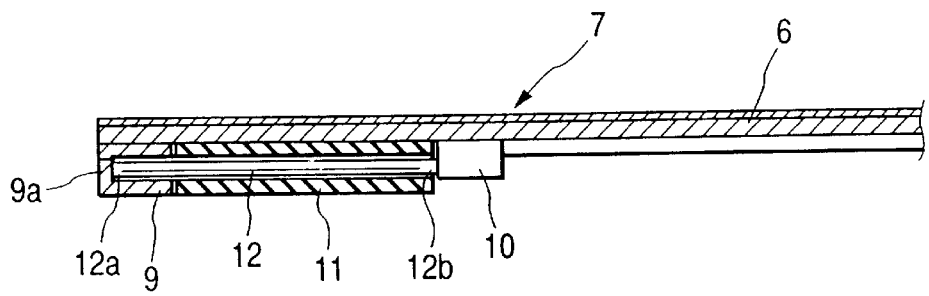
FIG. 3 shows an enlarged section of a connecting section of the cover member.
Figure 4:
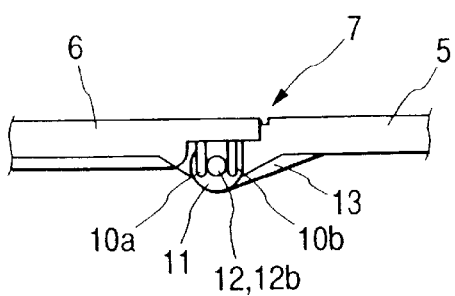
FIG. 4 shows an enlarged profile of the connecting section.

Next will be described the structure of the connecting section 7. As shown in FIGS. 3 and 4, part of the second segment 6 near the junction between the first segment 5 and the second segment 6 are provided a bottomed second cylindrical part 9 and two projections 10a and 10b in positions slightly away from the second cylindrical part 9. A first cylindrical part 11 provided on the first segment 5 side is inserted between the second cylindrical part 9 and the projections 10a and 10b. The first cylindrical part 11 has a through hole, and is arranged on substantially the same axial line as the second cylindrical part 9 when the first segment 5 and the second segment 6 are joined. As shown in FIGS. 2 and 4, one or a plurality of reinforcing ribs 13 are formed integrally with the first cylindrical part 11 on its outer circumference.

Figure 5:
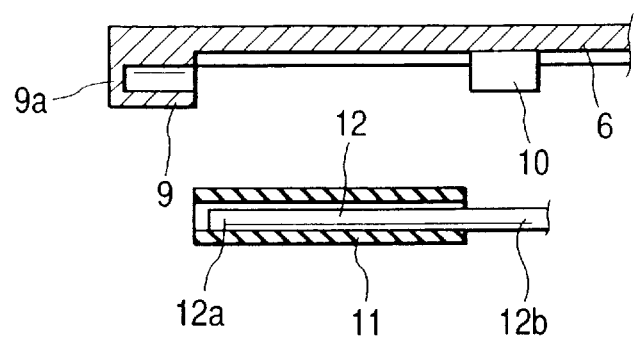
FIG. 5 is a partial sectional view illustrating an interim state of joining a first segment and a second segment.

The insertion of the straight rod-shaped connecting pin 12 from the first cylindrical part 11 through the second segment 6 as shown in FIG. 3 results in hinged joining of the first segment 5 and the second segment 6. As shown in FIG. 5, which is a partial sectional view illustrating an interim state of joining the first segment 5 and the second segment 6, whereas the connecting pin 12 is first inserted into the first cylindrical part 11, the tip 12a of the connecting pin 12 does not protrude beyond the tip of the first cylindrical part 11, while the rear end 12b of the connecting pin 12 protrudes beyond the rear end of the first cylindrical part 11.

While the first cylindrical part 11 is being inserted between the second cylindrical part 9 and the projections 10a and 10b in this state, the rear end 12b of the connecting pin 12 is inserted between the two projections 10a and 10b. The gap G between the projections 10a and 10b is slightly narrower than the outer diameter D of the connecting pin 12 (G<D), and the insertion of the rear end 12b between the projections 10a and 10b subjects the projections 10a and 10b to slight elastic deformation outward to hold the connecting pin 12 between the projections 10a and 10b.

Next, the connecting pin 12 is pressed into the second cylindrical part 9. The length L1 of the connecting pin 12 is designed not to be greater than the gap L2 between the bottom 9a of the second cylindrical part 9 and the projections 10a and 10b (L1 <L2). Upon completion of the pressing-in of the connecting pin 12, the rear end 12b of the connecting pin 12 comes off the projections 10a and 10b, and is accommodated between the bottom 9a of the second cylindrical part 9 and the projections 10a and 10b. When the connecting pin 12 is being pressed in, the bottom 9a of the second cylindrical part 9 functions as a pin stopping section.

The projections 10a and 10b having come off the rear end 12b of the connecting pin 12 return to their original state to partly oppose the bottom 9a of the second cylindrical part 9 and to function as stoppers for the connecting pin 12 (see FIGS. 3 and 4). In this manner, the first segment 5 and the second segment 6 are foldably connected.

Figure 6:
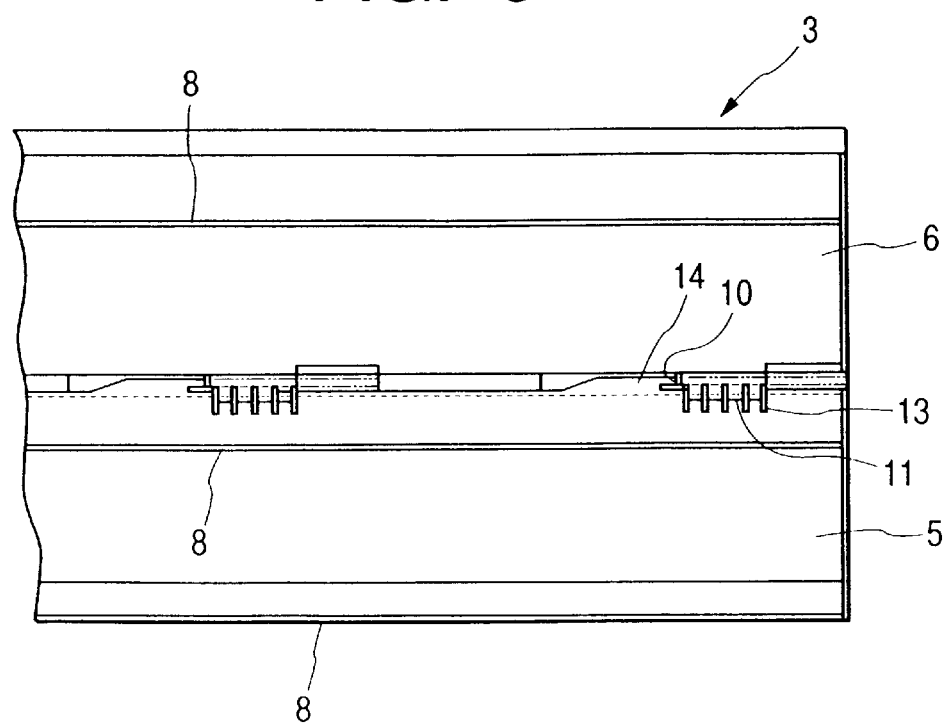
FIG. 6 illustrates part of the bottom of a cover member for use on a keyboard input unit, which is a second preferred embodiment of the invention.
Figure 7:
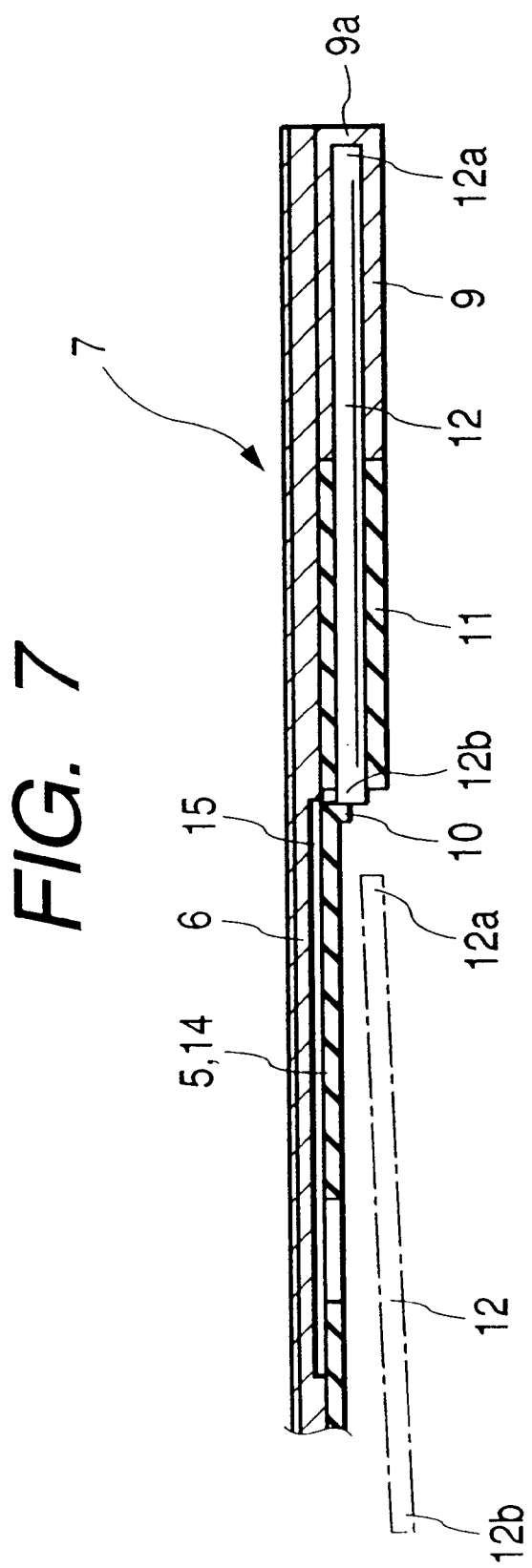
FIG. 7 shows an enlarged section of a connecting section of the cover member.
Figure 8:
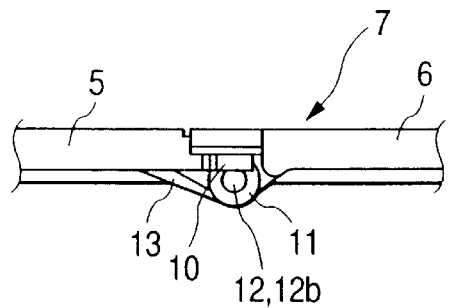
FIG. 8 shows an enlarged profile of the connecting section.

FIGS. 6 through 8 illustrate a second preferred embodiment of the present invention.

In this embodiment, too, a first segment 5 is provided with a first cylindrical part 11 having a through hole, and a second segment 6, with a second cylindrical part 9 having a bottom 9a. An elastic piece 14 having a projection 10 formed at its free end is provided on the side contrary to the side of the first segment 5 of the first cylindrical part 11 opposite the second cylindrical part 9, i.e. on the upstream side of the first cylindrical part 11 in the connecting pin inserting direction. As illustrated in FIG. 7, a gap 15 to permit elastic deformation of the elastic piece 14 is provided between the elastic piece 14 and the second segment 6 lying on top of it.

After laying the second segment 6 over the first segment 5 to arrange the first cylindrical part 11 and the second cylindrical part 9 on the same axial line, the connecting pin 12 is inserted with a slight inclination into the first cylindrical part 11 while suppressing the projection 10 as illustrated by a one-dot chain line in FIG. 7. As the pressure on the projection 10 displaces the elastic piece 14 toward the gap 15, the connecting pin 12 can be easily inserted.

In this embodiment, too, as the length L1 of the connecting pin 12 is designed not to be greater than the gap L2 between the bottom 9a of the second cylindrical part 9 and the projections 10a and 10b (L1≦L2), upon completion of the pressing-in of the connecting pin 12, the connecting pin 12 is accommodated completely within the first cylindrical part 11 and the second cylindrical part 9, and at the same time the projection 10 is returned to its original position by the righting moment of the elastic piece 14, and part of the rear end 12b of the connecting pin 12 opposes the projection 10 to keep the connecting pin 12 from coming off. In this manner, the first segment 5 and the second segment 6 are foldably connected by the connecting pin 12.

Although the cover member is divided into two segments in the foregoing preferred embodiments, it can be divided into a greater number of segments as required. Also, though the cover member is divided in the lateral direction in the foregoing embodiments, it can be divided in the longitudinal or some other direction.

Although the first segment 5 and the second segment 6 are opened toward the operator facing the keyboard body 2 to be used as his or her wrist rest as shown in FIG. 1 in the foregoing embodiments, the cover member may as well be divided, for instance, in the longitudinal direction and opened toward either the right or left end of the keyboard body or as double-leafed doors. Or, the present invention can also be applied to a keyboard input unit whose cover member is folded beyond the keyboard body to serve as a receptacle for a document, such as a document sheet or slips.

According to the invention, as described above, in a keyboard input unit whose cover member covering the top of the keyboard body is divided into at least a first segment and a second segment, and the segments are foldably connected by a connecting section, wherein:

the connecting section has: a first cylindrical part with a through hole provided on the first segment; a second cylindrical part provided on the second segment, having at one end a pin stopping section, and arranged on substantially the same axial line as the first cylindrical part; a connecting pin inserted from the first cylindrical part through the second cylindrical part; and an elastic stopper formed integrally with the first segment or the second segment in a position on the first cylindrical part contrary to the second cylindrical part, and the connecting pin is inserted from the first cylindrical part through the second cylindrical part while subjecting the stopper to elastic deformation; the stopper is returned to its original position by righting moment upon completion of the insertion; and the connecting pin is arranged between the pin stopping section of the second cylindrical part and the stopper.

By using such a configuration, the invention dispenses with the connecting pin having a thinner part needed according to the prior art, resulting in an increased mechanical strength in the connecting section of the cover member. Moreover, the connecting pin is automatically prevented from coming off by only inserting it, resulting in simplified assembly, which can be automated. Furthermore, the connecting pin may be a straight rod, instead of an E ring needed according to the prior art, and this feature contributes to cost reduction and makes it possible to supply an inexpensive keyboard input unit.

What is claimed is:

1. A keyboard input unit whose cover member covering a top of a keyboard body is divided into at least a first segment and a second segment, the segments being foldably connected by a connecting section, wherein:

the connecting section has: a first cylindrical part with a through hole provided on the first segment; a second cylindrical part provided on the second segment, having at one end a pin stopping section, and arranged on substantially the same axial line as the first cylindrical part; a connecting pin inserted from the first cylindrical part through the second cylindrical part; and an elastic stopper formed integrally with one of the first segment and the second segment in a position on the first cylindrical part contrary to the second cylindrical part, and the connecting pin is inserted from the first cylindrical part through the second cylindrical part while subjecting the stopper to elastic deformation, the stopper being returned to an original position by righting moment upon completion of the insertion, and the connecting pin being arranged between the pin stopping section of the second cylindrical part and the stopper;

wherein both segments pivot on the connecting pin when both segments are folded.

2. The keyboard input unit, according to claim 1, wherein the stopper comprises two rib-shaped projections, a gap between which is slightly narrower than an outer diameter of the connecting pin.

3. The keyboard input unit, according to claim 1, wherein the stopper comprises an elastic piece having a projection, and a gap permitting displacement of the elastic piece is formed on a side of the elastic piece contrary to the projection.

4. The keyboard input unit, according to claim 1, wherein reinforcing ribs are formed integrally on an outer circumference of the first cylindrical part.

5. The keyboard input unit according to claim 1, wherein when the cover member is removed from the top surface of the keyboard body said cover acts as a hand rest for an operator while being folded at the connecting section.

6. The keyboard input unit according to claim 1, wherein one of the first segment and second segment is provided with a second connecting section for rotatably connecting to a main body of the keyboard.

7. A keyboard input unit comprising:

a keyboard body having a top; and a cover member covering the top of the keyboard body, the cover member divided into at least a first segment and a second segment, the segments being foldably connected by a connecting section, the connecting section having:

a first cylindrical part with a through hole provided on the first segment;

a second cylindrical part provided on the second segment, having at one end a pin stopping section, and arranged on substantially the same axial line as the first cylindrical part;

a connecting pin inserted from the first cylindrical part through the second cylindrical part; and an elastic stopper formed integrally with one of the first segment and the second segment in a position on the first cylindrical part contrary to the second cylindrical part, the connecting pin being arranged between the pin stopping section of the second cylindrical part and the stopper, and the stopper to be elastically deformed by the connecting pin during insertion and to return to an original position by righting moment upon completion of the insertion;

wherein both segments pivot on the connecting pin when both segments are folded.

8. The keyboard input unit, according to claim 7, wherein the stopper comprises two rib-shaped projections, the two rib-shaped projections having a gap therebetween, which is slightly narrower than an outer diameter of the connecting pin.

9. The keyboard input unit, according to claim 1, wherein the stopper comprises an elastic piece having a projection, a gap is formed between the elastic piece and one of the segments, and the gap is formed on a side of the elastic piece opposing the projection.

10. The keyboard input unit, according to claim 7 further comprising reinforcing ribs formed integrally on an outer circumference of the first cylindrical part.

11. The Keyboard input unit according to claim 7, wherein when the cover member is removed from the top surface of the keyboard body said cover acts as a hand rest for an operator he connecting section.

12. Keyboard input unit according to claim 7, wherein one of the first segment and second segment is provided with a second connecting section for rotatably connecting to a main body of the keyboard.

\* \* \* \* \*

UNITED STATES PATENT AND TRADEMARK OFFICE
CERTIFICATE OF CORRECTION

PATENT NO. : 6,520,698 B2
DATED : February 18, 2003
INVENTOR(S) : Yoshirou Koutaka It is certified that error appears in the above-identified patent and that said Letters Patent is hereby corrected as shown below:

<u>Column 6,</u>
Lines 1 and 48, immediately after "keyboard body" insert -- , -- (comma).
Line 38, delete "claim 1," and substitute -- claim 7, -- in its place.
Line 43, immediately after "claim 7" insert -- , -- (comma).
Line 46, "Keyboard" and substitute -- keyboard -- in its place.
Line 49, delete "operator he" and substitute -- operator while being folded at the -- in its place.
Line 50, delete "Keyboard" and substitute -- The keyboard -- in its place.

Signed and Sealed this

Second Day of September, 2003

JAMES E. ROGAN
*Director of the United States Patent and Trademark Office*